United States Patent
Song et al.

(10) Patent No.: US 6,710,837 B1
(45) Date of Patent: Mar. 23, 2004

(54) LIQUID CRYSTAL DISPLAYS HAVING MULTI-DOMAINS AND A MANUFACTURING METHOD THEREOF

(75) Inventors: Jang-Kun Song, Seoul (KR); Seung-Beom Park, Kyungki-do (KR); Byoung-Sun Na, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/311,718

(22) Filed: May 14, 1999

(30) Foreign Application Priority Data

May 16, 1998 (KR) .............................. 98-17734

(51) Int. Cl.[7] ..................... G02F 1/1343; G02F 1/1337
(52) U.S. Cl. ....................................... 349/143; 349/130
(58) Field of Search .................................. 349/130, 143

(56) References Cited

U.S. PATENT DOCUMENTS

| | | | |
|---|---|---|---|
| 5,229,873 A | * 7/1993 | Hirose et al. | 349/139 |
| 5,473,455 A | * 12/1995 | Koike et al. | 349/132 |
| 5,608,556 A | * 3/1997 | Koma | 349/143 |
| 5,953,093 A | * 9/1999 | Hirata et al. | 349/143 |
| 6,141,074 A | * 10/2000 | Bos et al. | 349/129 |
| 6,256,080 B1 | * 7/2001 | Colgan et al. | 349/129 |
| 6,285,431 B2 | * 9/2001 | Lyu et al. | 349/143 |

FOREIGN PATENT DOCUMENTS

| | | | |
|---|---|---|---|
| JP | 7-311383 | * 11/1995 | |
| KR | 1992-1949 | 9/1993 | ........... G02F/1/343 |

* cited by examiner

*Primary Examiner*—Dung Nguyen
(74) *Attorney, Agent, or Firm*—McGuireWoods LLP

(57) ABSTRACT

A black matrix and a color filter are formed on a substrate, a indium-tin-oxide (ITO) common electrode are deposited thereon and then protrusion pattern made of sensitive material such as photoresist are formed on the common electrode with 3 to 20 micron width. A vertical alignment layer is coated thereon to complete a color filter substrate. After a thin film transistor (TFT) and a passivation film are formed on the other substrate, ITO is deposited on the passivation film and patterned to form a pixel electrode which contains open areas with 3 to 20 micron width. Then, a vertical alignment layer is coated to complete a TFT substrate. Two substrates are assembled in the manner that the apertures and the protrusion patterns are arranged on shifts and liquid crystal having negative dielectric anisotropy is injected between the substrates. Each Polarizer is attached at the outer surface of the LCD substrates. Compensation films may be attached between the polarizer and the substrate.

36 Claims, 21 Drawing Sheets

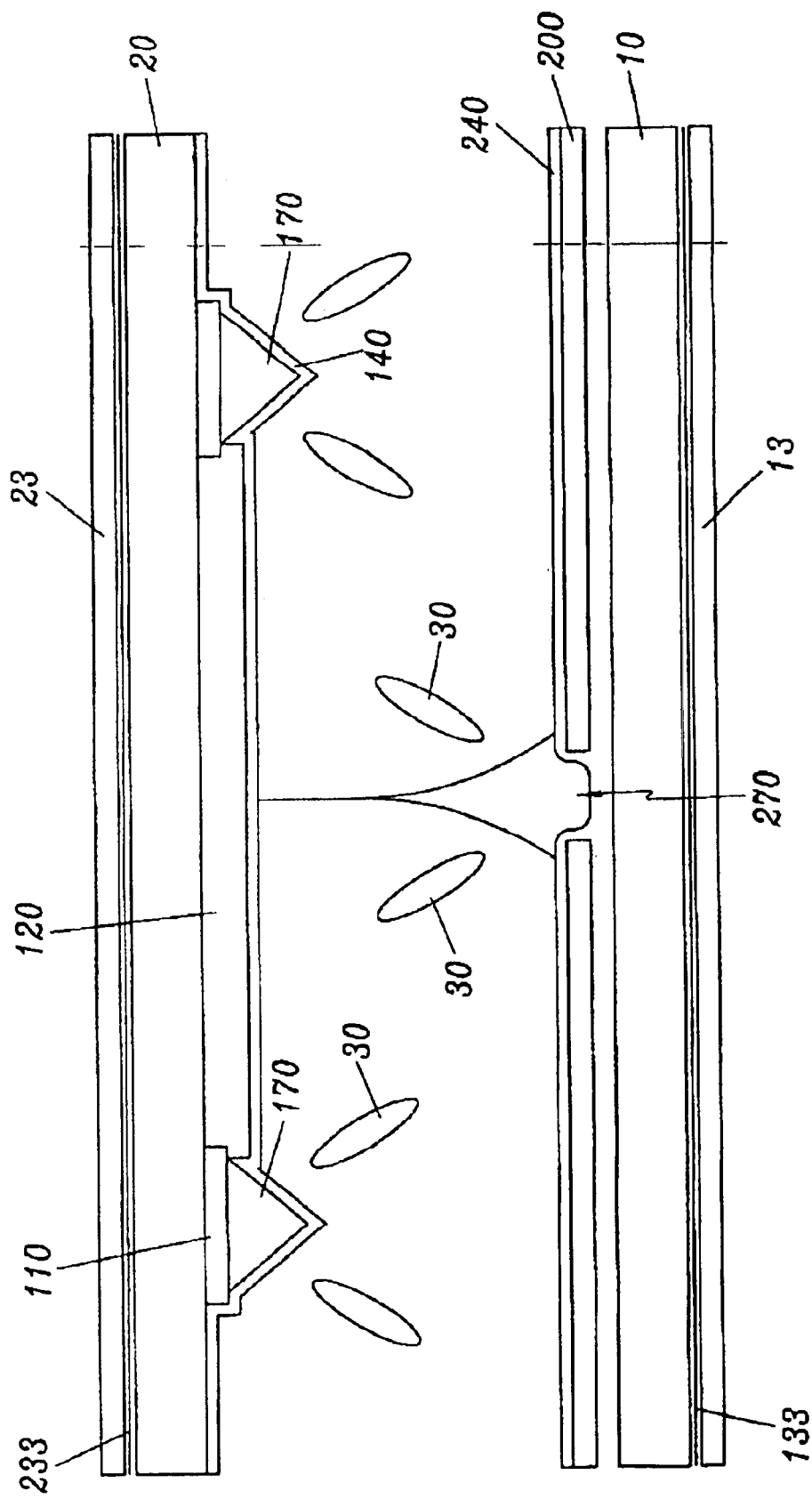

LIQUID CRYSTAL DISPLAYS HAVING MULTI-DOMAINS AND A MANUFACTURING METHOD THEREOF

BACKGROUND OF THE INVENTION (a) Field of the Invention

The present invention relates to liquid crystal displays (LCDs) and a manufacturing method thereof, in particular, to vertically-aligned liquid crystal displays (VA LCDs) having multi-domains in a pixel region and a manufacturing method thereof.

(b) Description of the Related Art

A liquid crystal display (LCD) includes two substrates and a liquid crystal layer interposed therebetween. The transmittance of the incident light is controlled by the strength of the electric field applied to the liquid crystal layer.

A vertically aligned twisted nematic (VATN) liquid crystal display has a couple of transparent substrates which have transparent electrodes respectively on their inner surfaces, a chiral nematic liquid crystal layer having negative anisotropy between the substrates and a couple of polarizers which are respectively attached to the outer surfaces of the substrates. In the off state of the LCD, i.e., in the state that the electric field is not applied to the liquid crystal layer, the molecular axes or the long axes of the liquid crystal molecules are perpendicular to the substrates. On the other hand, in the on state of the LCD, i.e., in the state that the sufficient electric field caused by the voltage different between the electrodes is applied to the liquid crystal layer, the long axes of the liquid crystal molecules are parallel to the substrates by the negative anisotropy and twisted spirally by the chirality with a pitch from the inner surface of one substrate to the other substrate. Accordingly, the orientation of the long axes of the liquid crystal molecules vary continuously.

A VATN LCD in normally block mode may have an off state which is sufficiently dark because the molecular axes of the liquid crystal molecules are uniformly aligned perpendicular to the substrates in the off state. Therefore, the contrast ratio is relatively high compared with a conventional TN LCD. In addition, the viewing angle may be strongly dependent on the viewing directions. Therefore, it is suggested to form multi-domains in a pixel by providing apertures in the electrode by Clere in U.S. Pat. No. 5,136,407 and by Hirose in U.S. Pat. No. 5,229,873, etc.

SUMMARY OF THE INVENTION

One object of the present invention is to form patterns for multi-domains to enlarge to range of viewing angle.

Another object of the present invention is to reduce the steps of forming patterns for multi-domains.

Another object of the present invention is to reduce light leakage near the boundary of multi-domains to improve the contrast ratio.

To achieve these objects of the present invention, aperture pattern is formed in pixel electrodes on a TFT substrate and protrusion pattern is formed on a color filter substrate to form multi-domain alignment of liquid crystal.

A liquid crystal layer having negative dielectric anisotropy may be interposed between the substrates, and alignment layers may be formed on inner surfaces of the substrates respectively.

A pair of polarizers of which the polarzing directions are preferably perpendicular to each other may be attached to outer surfaces of the substrates.

Compensation films may be attached between one of the substrates and one of the polarizers attached thereto, and a biaxial or a combination of an a-plate and a c-plate compensation films may be used. The slow axis of the biaxial or the a-plate compensation film is preferably parallel or perpendicular to the polarizing directions of the polarizers.

The aperture pattern and the protrusion pattern may be formed as a shape of a wedge at an angle of 45 degrees with respect to the polarzing axis of the polarizers.

The aperture pattern may be cross-shaped or X-shaped perpendicular to the polarizing axis of the polarizer and the protrusion pattern may be tetragon shape surrounding the aperture pattern. The width of the cross-shaped pattern decreases as goes from a center to the edge of the pattern.

The width of the aperture pattern, the width of the protrusion pattern and the height of the protrusion pattern are 3 to 20 microns, 3 to 20 microns and 0.3 to 3 microns respectively.

Black matrix overlapping the protrusion pattern may be formed on the upper substrate and a wire overlapping the aperture pattern may be formed on the lower substrate.

To achieve the objects of the present invention, a pixel electrode having wedge-shaped aperture pattern is formed on the lower substrate and protrusion pattern arranged to the aperture pattern alternately and in parallel are formed on the upper substrate.

In the upper substrate, a black matrix overlapping the aperture pattern may be formed.

The black matrix may include the fist portion overlapping the protrusion pattern, the second portion put across the bent points of the wedge-shaped aperture pattern and the protrusion pattern and the third portion covering a portion that the aperture pattern and the protrusion pattern meet a boundary of the pixel electrode.

The third portion of the black matrix may be formed as a triangular shape.

The black matrix may include the fourth portion overlapping the aperture pattern.

The edge of the pixel electrode between the aperture pattern and the protrusion pattern may be perpendicular to the aperture pattern.

In a manufacturing method of the present invention, aperture patterns of the TFT substrate are simultaneously formed at the step of forming the pixel electrode. Then protrusion pattern is formed on the color filter substrate in a manner to arrange to the aperture patterns alternately and in parallel.

The protrusion pattern may be formed by coating a photo-sensitive film, exposing, developing and baking the film.

As described, the aperture pattern is formed at the step of patterning the ITO pixel electrode and a passivation film may not be coated on color filters. As a result, the number of the manufacturing steps decrease.

BRIEF DESCRIPTION OF THE DRAWINGS

FIG. 5 is a schematic sectional view of a VATN LCD according to the third to the tenth embodiments of the present invention.

DETAILED DESCRIPTION OF THE PREFERRED EMBODIMENTS

Figure 1A:
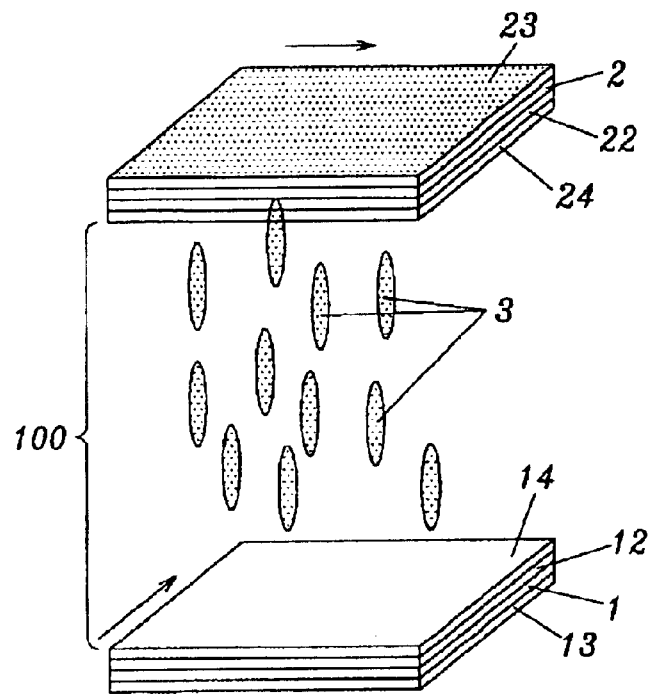
FIGS. 1A and 1B are schematic diagrams of a VATN LCD respectively in black state and white state according to the present invention.

The present invention now will be described more fully hereinafter with reference to the accompanying drawings, in which preferred embodiments of the invention are shown. This invention may, however, be embodied in many different forms and should not be constructed as limited to the embodiments set forth herein; rather, these inventions are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Figure 1B:
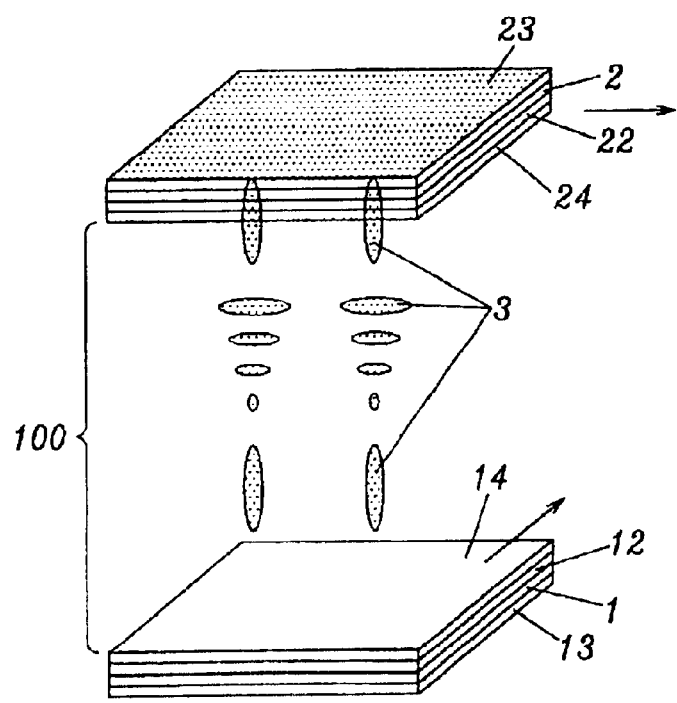

FIGS. 1A and 1B are schematic diagrams King the alignment of the liquid crystal molecules of a VATN LCD respectively in black stale and white state, according to the present invention.

As shown in FIGS. 1A and 1B, two glass or quartz substrates 1 and 2 are spaced apart from each other. On the inner surfaces of the substrates 1 and 2, transparent electrodes 12 and 22 made of a transparent conductive material such as ITO (indium tin oxide) or the like are formed respectively, and homeotropic or vertical alignment layers 14 and 24 are formed thereon respectively. Between the substrates 1 and 2, a liquid crystal layer 100 including a chiral nematic liquid crystal material having negative dielectric anisotropy is disposed. Instead of the chiral nematic liquid crystal, a nematic liquid crystal mixed with chiral dopants may be used. On the outer surfaces of the substrates 1 and 2, polarizers 13 and 23 are attached. The polarizers 13 and 23 polarize the rays incident on the liquid crystal layer 100 and the rays out of the liquid crystal layer 100 respectively. The polarzing directions of the polarizers 13 and 23, represented as arrows in FIGS. 1A and 1B, are perpendicular to each other. The alignment layers 14 and 24 may be rubbed or not.

FIG. 1A shows the off state that the electric field is not applied. The long axes or the molecular axes of the liquid crystal molecules 3 in the liquid crystal layer 100 are aligned perpendicular to the surface of the substrates 1 and 2 by the aligning force of the alignment layers 14 and 24.

The polarized light by the polarizer 13 attached to the lower substrate 1 passes through the liquid crystal layer 100 without changing its polarization. Then, the light is blocked by the analyzer 23 attached to the upper substrate 2 to make a black state.

FIG. 1B shows the on state that the sufficient electric field is applied to the liquid crystal layer 100. The liquid crystal molecules 3 in the liquid crystal layer 100 are twisted spirally by 90° from the lower substrate 1 to the upper substrate 2, and the director of the liquid crystal layer 100 vanes continuously. However, near the inner surfaces of two substrates 1 and 2, since the aligning force of the alignment layers 14 and 24 is larger than the force due to the applied electric field, the liquid crystal molecules stay vertically aligned.

The polarized light by the polarizer 13 passes through the liquid crystal layer 100, and its polarization is rotated by 90° according to the variation of the director of the liquid crystal layer 100. Therefore, the light passes through the analyzer 23 to make a white state.

The LCD shown In FIGS. 1A and 1B is a basic structure of the following embodiments of the present invention.

The basic structures and the principles for compensating the viewing angle according to the embodiments of the present invention are described with reference to FIGS. 2, 3A and 3B. Here, the liquid crystal layer is assumed to be chiral nematic or nematic mixed with chiral dopants, and to have negative anisotropy.

Figure 2:
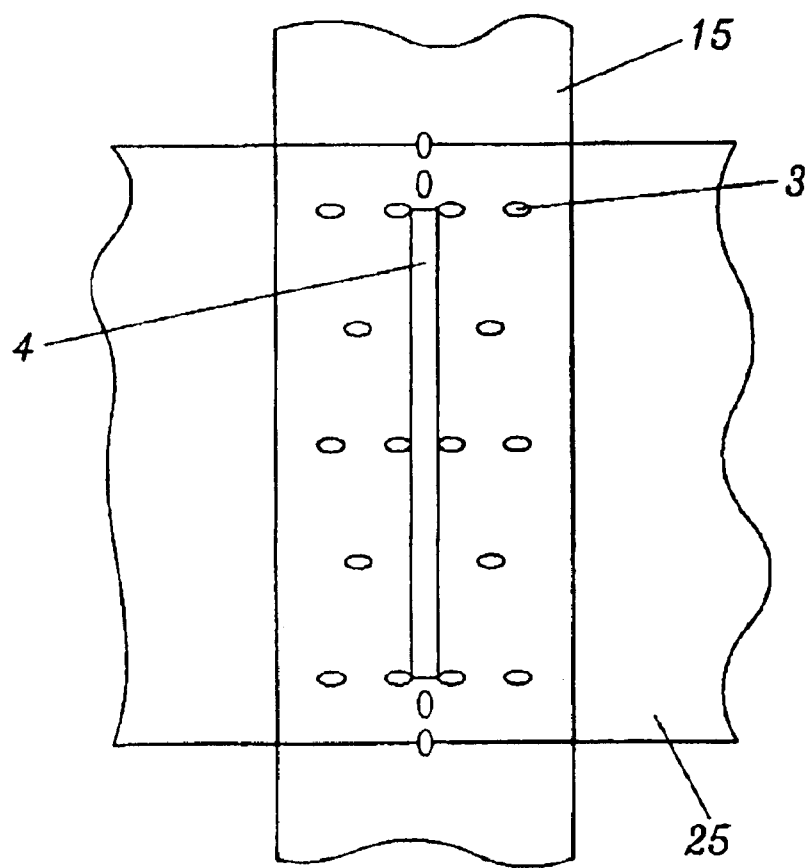
FIG. 2 is a layout view of the pattern for forming multi-domains according to the present invention.
Figure 3A:
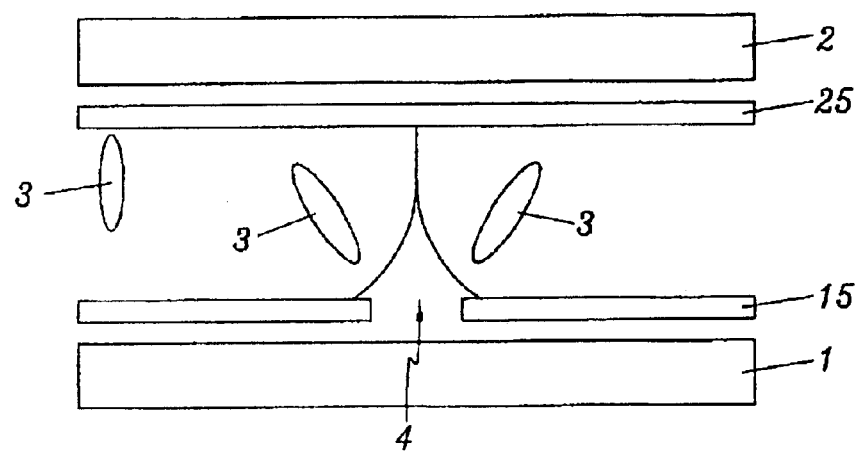
FIGS. 3A and 3B are schematic sectional views of VATN LCDs according to the present invention.

FIG. 2 is a layout view of a VATN LCD having an aperture for forming multi-domains, and FIG. 3A is a sectional view of a VATN LCD showing the structure of the electrodes and the alignment of the liquid crystal molecules according to the present invention. FIGS. 2 and 3A show only a few elements for simplicity and, therefore, the elements such as polarizers, etc., are eliminated.

As shown in FIG. 2 and FIG. 3A, an ITO electrode 15 formed on a lower substrate 1 has a linear aperture 4 extending in a horizontal direction. Although the aperture 4 has a linear shape, it actually has the width. The lower substrate 1 is opposite an upper substrate 2 having a transparent common electrode 25 thereon. A liquid layer composed of liquid crystal molecules 3 is interposed between two substrates 1 and 2.

In absence of electric field, the liquid crystal molecules 3 are vertically aligned to show the black state under crossed-polarizers (not shown). When voltages are applied to the electrode 15 and 25, an electric field is generated in the liquid crystal layer due to the voltage difference between the electrodes 15 and 25. The field direction in most regions been the electrodes 15 and 25 is perpendicular to the substrates 1 and 2. However, near the aperture 4 of the ITO electrode 15, the electric field is curved and not completely perpendicular to the substrates 1 and 2. The electric field near the aperture 4 is called the fringe field, and the fringe field is symmetrical with respect to the aperture 4.

Since the long axes of the liquid crystal molecules 3 tend to be perpendicular to the field direction, the long axes of the liquid crystal molecules 3 near the aperture 4 are tilted symmetrically in opposite directions with respect to the aperture 4. In addition, the molecular axes tend to twisted on going from the upper substrate 2 to the lower substrate 1. As a result, two domains having opposite tilt directions of the liquid crystal molecules 3 are formed at both sides of the aperture 4, and may compensate the viewing angle.

The substitution of the aperture 4 with a protrusion having a symmetrical cross section may give a similar effect, which will be described next.

Figure 3B:
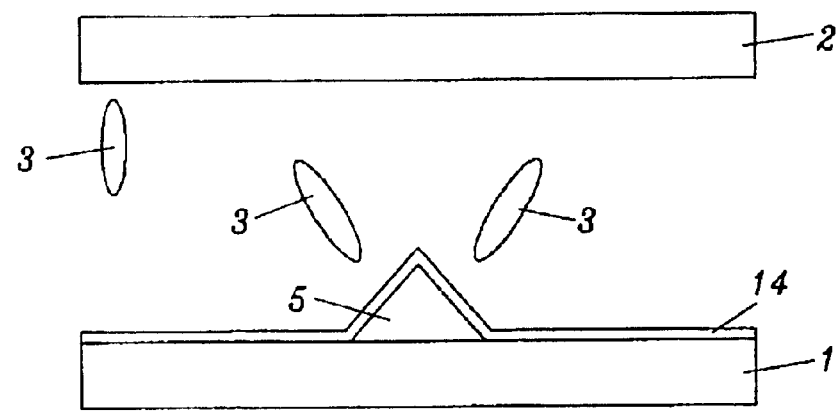

FIG. 3B is a sectional view of a VATN LCD having a protrusion according to the present invention. The layout view of the LCD is similar to FIG. 2 except the numeral 4, which may be assumed to be a protrusion.

As shown in FIG. 3B, a linear protrusion 5 having a wedge-shaped cross section is formed on a lower substrate 1 and extends in a horizontal direction. Although the protrusion 5 has a linear shape, it actually has the width. A vertical alignment layer 14 is formed thereon. A lower substrate 1 is opposite an upper substrate 2, and a liquid crystal layer including liquid crystal molecules 3 is interposed between the substrates 1 and 2.

In the absence of an electric field, the liquid crystal molecules 3 near the protrusion 5 are perpendicular to the surface of the protrusion 5 since the liquid crystal molecules 3 tend to erect perpendicularly to the surface of the alignment layer 14 by the aligning force of the alignment layer 14. Since the cross section of the protrusion 5 is symmetrical, the molecules 3 are symmetrically arranged with respect to the protrusion 5. Therefore, two domains having opposite hit directions with respect to the protrusion 5 are generated at the both sides of the protrusion 5 even in the off state.

When an electric field is applied between the substrates 1 and 2, the liquid crystal molecules 3 in the two domains are tilted in opposite directions and tend to be horizontally arranged to the substrates 1 and 2.

However, the molecules 3 near the surface of the upper substrate 2 where the apertures or protrusions do not exist and near the center of a region between the apertures 4 or the protrusions 5, which are far from the apertures 4 or the protrusions 5, may not be affected by the electric field near the apertures 4 or the protrusions 5. The arrangement of the molecules 3 in the region may not be so uniform and the response time may not be so short. Therefore, it will be described that the patterns such as apertures or protrusions are provided in both substrates 1 and 2.

Figure 4A:
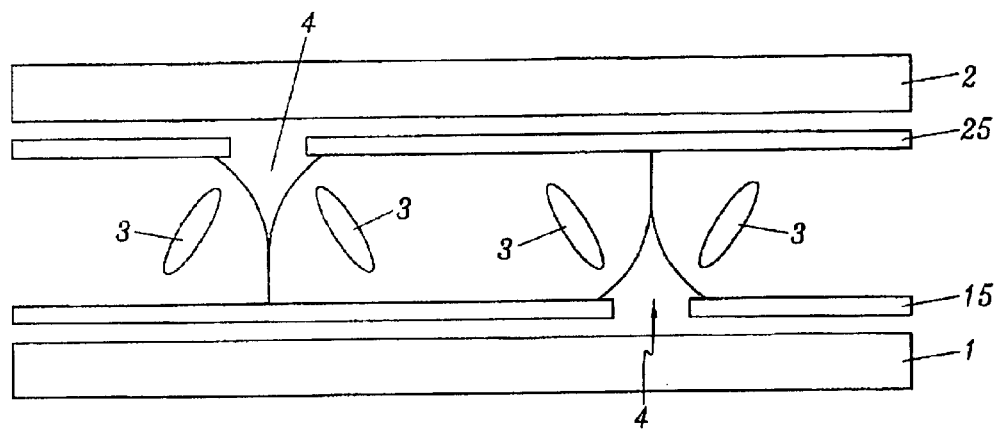
FIGS. 4A and 4B are schematic sectional views of VATN LCDs according to the first and the second embodiments of the present invention, respectively.
Figure 4B:
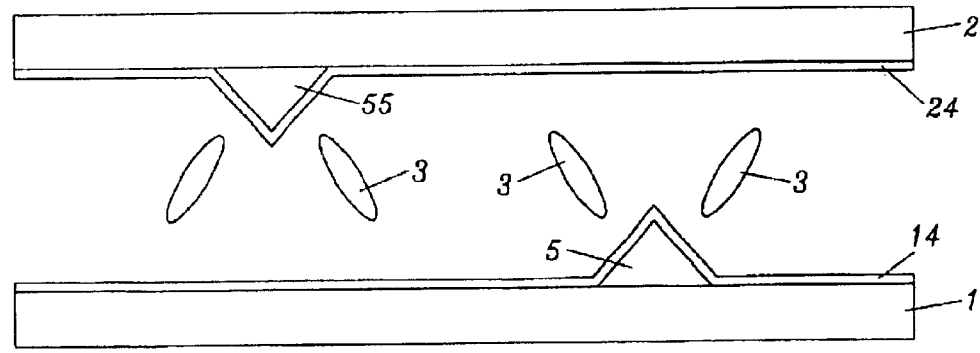

FIGS. 4A and 4B are cross sectional views of LCDs according to the first and the second embodiments of the present invention, respectively.

As shown in FIG. 4A, an ITO electrode 15 formed on a lower substrate 1 has a linear aperture 4 and a common electrode 26 formed on a upper substrate 2 opposite the lower substrate 1 also has a linear aperture 44. A liquid crystal layer composed of liquid crystal molecules 3 are interposed between the substrates 1 and 2. The aperture 44 is parallel to and spaced apart from the aperture 4 when viewed from the top.

The fringe fields due to both the apertures 4 and 44 make the molecules in a region between adjacent apertures 4 and 44 to incline in the same direction. Therefore, the liquid crystal molecules 3 in the region between the aperture 4 and the aperture 44 are aligned more uniformly and the response time becomes reduced.

Next as shown in FIG. 4B, a linear protrusion 5 having a wedge-shaped cross section is formed on a lower substrate 1 and a vertical alignment layer 14 is formed thereon. A linear protrusion 55 having a wedge-shaped cross section is formed on an upper substrate 2 opposite the lower substrate 1, and a vertical alignment layer 24 is formed thereon. The protrusions 5 and 55 are parallel to and spaced apart from each other when viewed from the top. A liquid crystal layer including liquid crystal molecules 3 is interposed between the substrates 1 and 2 and the liquid crystal molecules 3 are perpendicular to the surfaces of the alignment layers 14 and 24 by the aligning force of the alignment layers 14 and 24.

As similar to the first embodiment, the molecules in a region between adjacent protrusions 5 and 55 are inclined in the same direction by the protrusions 5 end 55. Therefore, the liquid crystal molecules 3 in the region between the protrusions 5 and 55 are aligned more uniformly and the response time becomes reduced.

However, the LCDs of the first and the second embodiments may have some problems.

The number of the manufacturing steps of the LCD shown in FIG. 4A and FIG. 4B increases, as described below.

First, if the upper substrate 2 shown in FIG. 4A has color filters under the common electrode 25, while wet etch of the common electrode 25 are performed by using ITO etchant to form the apertures 4 and 44, the etchant may attack or contaminate the color filter. Therefore, a passivation film made of organic or inorganic material should be interposed between the color filter and the ITO electrode. Therefore, the step of forming the passivation film may be added.

Second, of the LCD shown in FIG. 4B, the step of forming the protrusions 5 and 55 may be added.

In addition, the light leakage may be yielded near the protrusions 5 and 55, since the long axes of the liquid crystal molecules 3 near the protrusions 5 and 55 are not perpendicular to the substrates 1 and 2 in the off state. Accordingly, brightness in dark state increases and the contrast ratio decreases.

Now, in order to solve these problems, LCDs according to the third to the tenth embodiments are described.

FIG. 5 shows a cross sectional view of a vertically aligned liquid crystal display having multi-domains according to the fifth to the twelfth embodiments of the present invention. The liquid crystal layers in the embodiments are interposed between a upper substrate and a lower substrate and are composed of liquid crystal material having negative anisotropy and chirality.

As shown in FIG. 5, a linear aperture 270 is formed in an ITO pixel electrode 200 on the inner surface of a lower insulating substrate 10, and a vertical alignment film 240 is coated thereon. A black matrix 110 and a color filter 120 formed between the black matrix is formed on the inner surface of an upper insulating substrate 20 facing the lower substrate 10. A plurality of linear protrusion 170 are formed on the black matrix 110, and a vertical alignment film 140 is coated thereon. The upper and lower substrates 20 and 10 are arranged in a manner that the protrusions 170 and the aperture 270 are alternately arranged. A liquid crystal layer having negative dielectric anisotropy is interposed between two substrates 10 and 20 and vertically aligned to the surfaces of the substrates 10 and 20 by the vertical alignment film 240 and 140.

Furthermore, polarizers 13 and 23 are attached on the outer surfaces of the assembled substrates 10 and 20. The polarizing axes of the polarizers 13 and 23 are perpendicular to each other.

Compensation films 133 and 233 are interposed between polarizer 13 and 23 and the substrates 20 and 10 respectively. One of the compensation films may be an a-plate compensation film and the other a c-plate compensation film. Otherwise, both the compensation films may be c-plate compensation films. A biaxial compensation film may be used instead of the uniaxial compensation film, and, in this case, the biaxial compensation film may be attached to only one substrate. The slow axis, which is the direction having a largest refractive index, of the a-plate or the biaxial compensation film may be parallel or perpendicular to the polarizing directions of the polarizers 13 and 23.

Here, since the protrusions 170 are formed only one substrate 20, the light leakage near the protrusions 170 decreases compared with the second embodiment, Furthermore, since the protrusions 170 are formed on the color filter 120 and it is not necessary to etch the common electrode (not shown), the manufacturing process of the color filter substrate is simple compared with the first embodiment. In addition, since the lower substrate does not have protrusions, the manufacturing process of the lower substrate is simple compared with the second embodiment.

The manufacturing method of the LCD will be described in detail later.

The LCD shown in FIG. 5 may have various layouts, which will be described in third to the tenth embodiments.

The third to the tenth embodiments of the present invention are related to liquid crystal displays (LCDs) having patterns for forming four domains in a pixel region.

Now, the third embodiment of the present invention will be described with reference to FIG. 5 showing a pixel having patterns for four domains.

A protrusion pattern including a plurality of linear protrusions 170 formed on a color filter substrate and an aperture pattern including a plurality of linear apertures 270 formed in a pixel electrode 200 on a TFT substrate 10 have substantially wedge shapes having bent portions placed on the transverse center line passing through the center of a pixel. The protrusions 170 and the apertures 270 are arranged alternately, and are parallel to each other in respective half portions at upper and lower sides of the transverse center line.

The liquid crystal molecules in adjacent two regions divided by the aperture 270 or the protrusion 170 either in the upper half portion or in the lower half portion have opposite tilt directions. Therefore, two domains are obtained in each half portion.

Furthermore, the liquid crystal molecules in the upper half portion and in the lower half portion have different tilt directions. Therefore, four domains having different tilt directions are obtained in a single pixel to enlarge the viewing angle more than the first and the second embodiments.

The apertures 270 and the protrusions 170 are formed at an angle of 45 degrees with respect to the polarizing axis 111, and the long axes of the liquid crystal molecules are perpendicular to the protrusions 170 and the apertures 270. Therefore, the long axes of the liquid crystal molecules make 45 (or 135) angular degree with the polarizing directions of the polarizing axes 111 and 222. As described above, since four domains having different tilt directions, viewing angle is enlarged.

Figure 6:
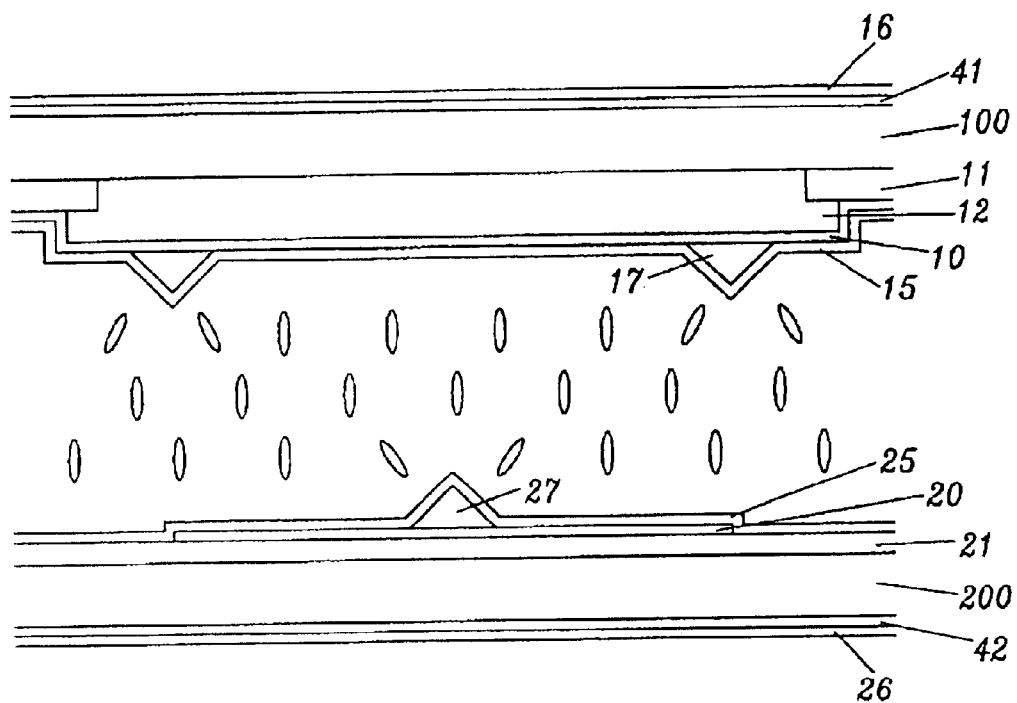
FIG. 6 is a layout view of a pixel in a VATN LCD having patterns for forming multi-domains according to the third embodiment of the present invention.
Figure 7:
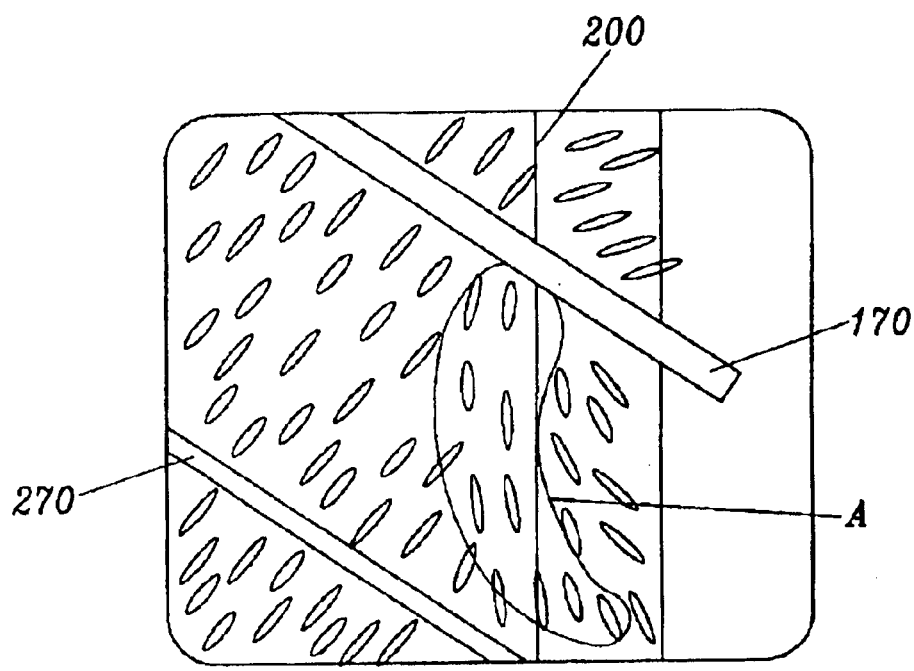
FIG. 7 is an enlarged view of a portion (a) in FIG. 6.

In this embodiment, however, the arrangement of liquid crystal molecules fall into disorder near the bent portions of the patterns 170 and 270, and dislination is generated near the position where the apertures 270 meet the boundary of the pixel elected 200 because the angle therebetween is acute, as shown in FIG. 7 which is an enlarged layout view of potion (a) of FIG. 6. FIG. 7 shows that the arrangement of the liquid crystal molecules falls into disorder in the region A, which causes the decease of the luminance. Moreover, the disorder of the arrangement may cause the afterimage because the disordered region may move whenever different pixel voltages are applied.

Figure 8A:
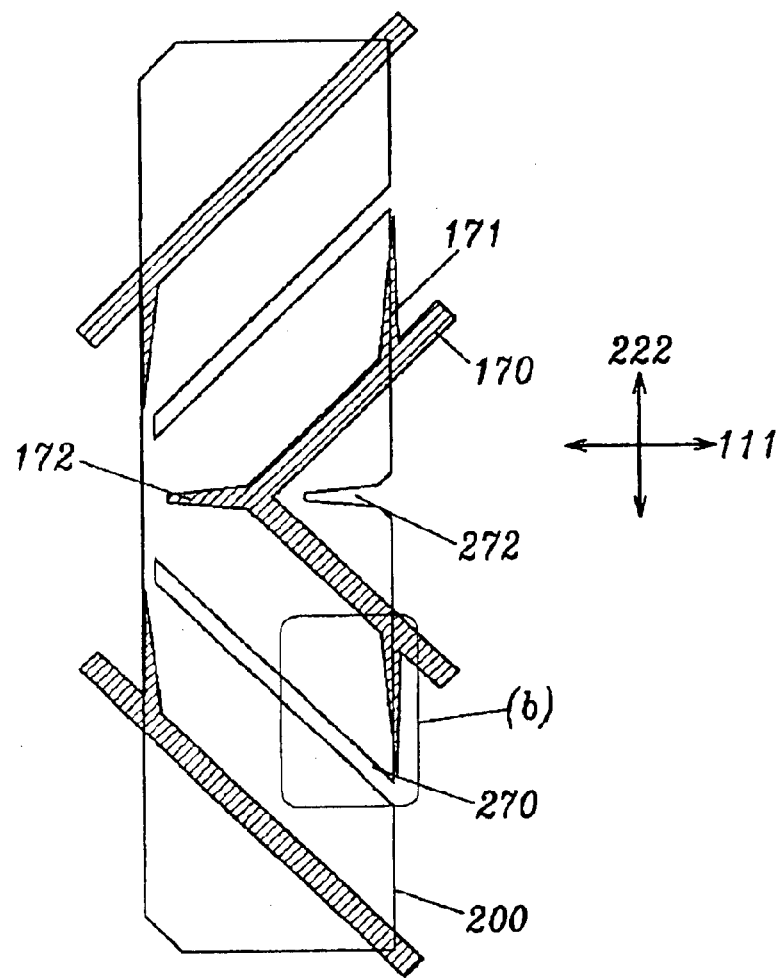
FIGS. 8A and 8B are layout views of pixels in a VATN LCD having patterns for forming multi-domains according to the fourth embodiment of the present invention.
Figure 8B:
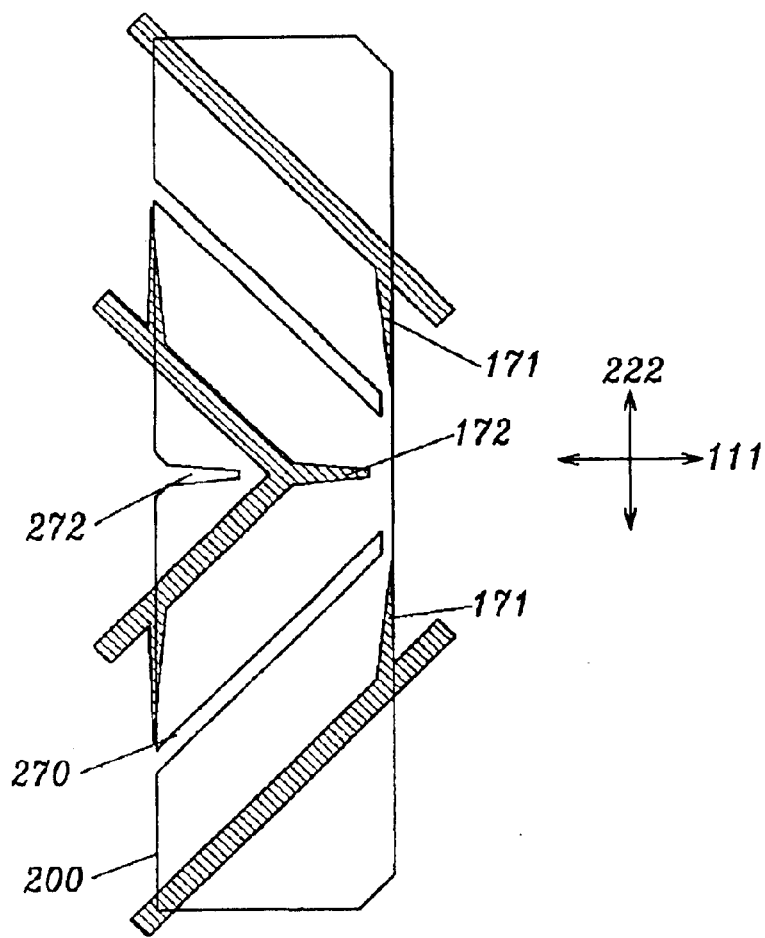

According to the fourth embodiment of the present invention shown in FIGS. 8A and 8B, the declination generated in the third embodiment may be removed.

The shapes of the patterns are substantially similar to the patterns of the fifth embodiment. That is, a protrusion pattern 170 formed on a color filter substrate and an aperture pattern 270 formed on a TFT substrate have wedge shapes, and the protrusions 170 and the apertures 270 are arranged alternately. The bent portions of the wedge-shaped patterns are placed on the transverse center line passing through the center of a pixel, and have a convex point and a concave point.

A first branch protrusion 172 extend from the convex point of the protrusion 170 toward the concave point of the aperture 270, and a branch aperture 272 extend from the convex point of the aperture 270 toward the concave point of the protrusion 170 along the transverse center line.

Second branch protrusions 171 of the protrusion pattern 170 extend from the points where the protrusions 170 meet the edges of the pixel electrode 200 toward the points where the edges of the pixel electrode 200 and the wedge-shaped aperture pattern 270 substantially make an acute angle. Therefore, the ends of the patterns 270 and 170 formed on the two substrates are close to each other, and the patterns 270 and 170 have only obtuse angles to remove the declination.

Figure 9:
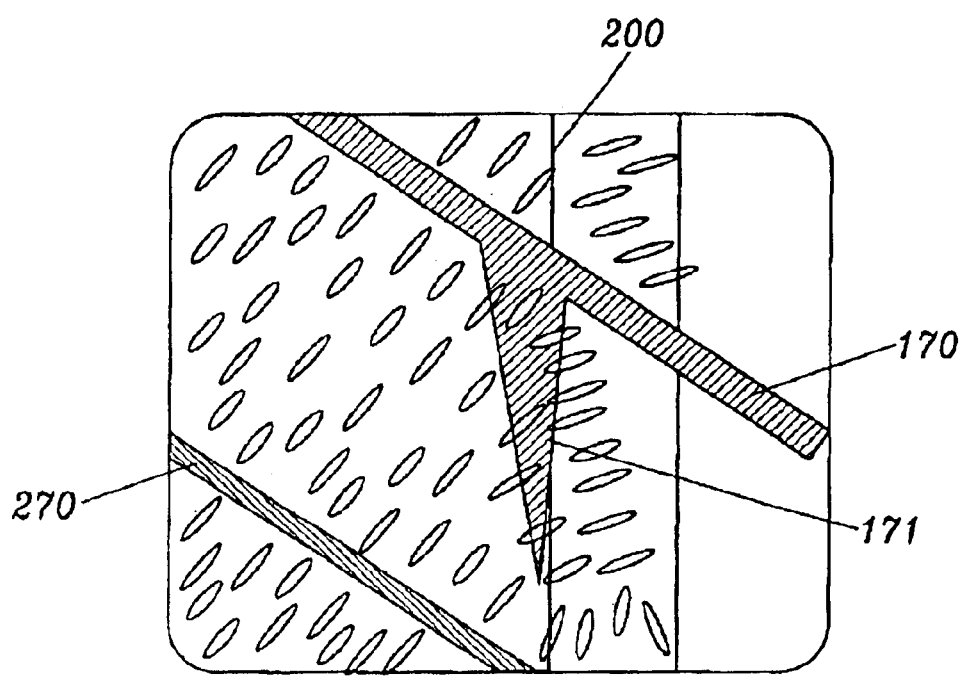
FIG. 9 is an enlarged view of a portion (b) in FIG. 8A.

That is, the liquid crystal molecules are arranged relatively in order by the branch protrusion 171 as shown in FIG. 9 which is an enlarged layout view of portion (b) of FIG. 8A.

The width of the first and the second branch protrusions 171 and 172 and the branch aperture 272 may gradually decrease from the point connected to the patterns 170 and 270 to the end of the branches 171, 172 and 272. The widths of the linear protrusions 170 and the linear apertures 270 are preferably in the range of 3 to 20 microns, and the distance therebetween are in the range of 5 to 20 microns.

In the fifth embodiment of the present invention, disclination may be prevented by a black matrix or a wire instead of forming branch patterns.

Figure 10:
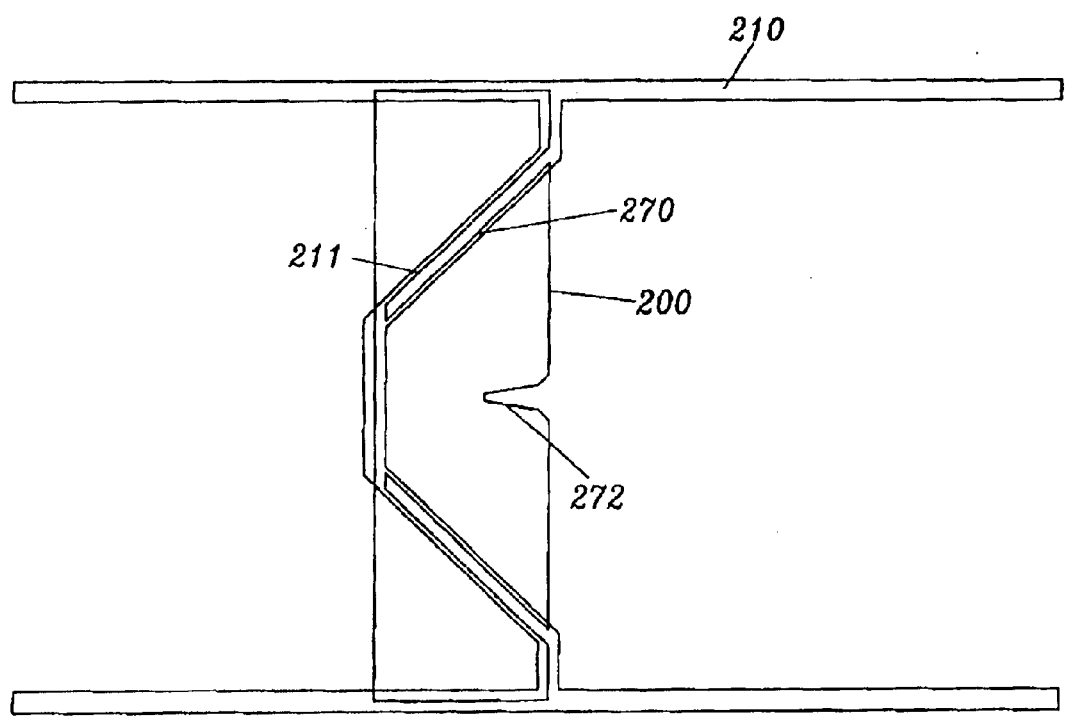
FIG. 10 is a layout view of a pixel region in a TFT substrate having a modified gate line according to the fifth embodiment of the present invention.
Figure 11:
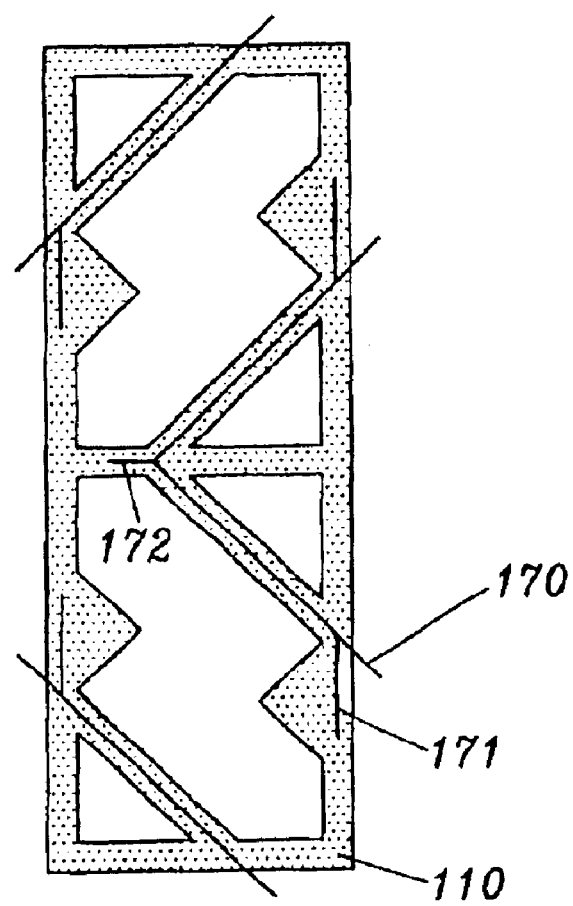
FIG. 11 is a layout view of a pixel region in a color fitter substrate having a black matrix and a protrusion pattern according to the fifth embodiment of the present invention.

FIGS. 10 and 11 are layout views of a TFT substrate and a color filter substrate according to the fifth embodiment respectively.

As shown in FIG. 10, a portion 211 of a gate line 210 which transmits a scanning signal is formed to have substantially the same shape as one of the apertures 270 which has the same shapes as those in FIGS. 8A and 8B. That is, the portion 211 has a trapezoid shape without the lower side. Then, the portion 211 made of opaque metal blocks the light from the backlight, and, therefore the light leakage or the decrease of luminance due to the aperture 270 may be removed.

Next, as shown in FIG. 11, a black matrix 110 is formed on the color filter substrate to cover the regions where disclination is generated and the protrusions 170, 171 and 172 on the color filter substrate. The disclination regions are, as described above, the regions where the apertures 270 on the TFT substrate meet the edges of the pixel electrode 200 and the region where the wedge-shaped patterns 170 and 270 are bent.

The black matrix pattern which covers the disclination includes, as shown in FIG. 11, an edge portion surrounding and defining a pixel region, a wedge-shaped portion to cover the pattern 170, a triangular portion to cover the disclination between wedge-shaped protrusions 170 and apertures 270 and a central portion put across the pixel region to cover the disclination generated in the bent portion of the patterns 170 and 270.

Then, the light leakage generated by the disclination or the patterns 170 and 270 is prevented by the black matrix 110. Moreover, additional decrease of the aperture ratio does not occur though the black matrix 110 is formed to have relatively large area because the region where the black matrix covers may not be used for display.

Figure 12:
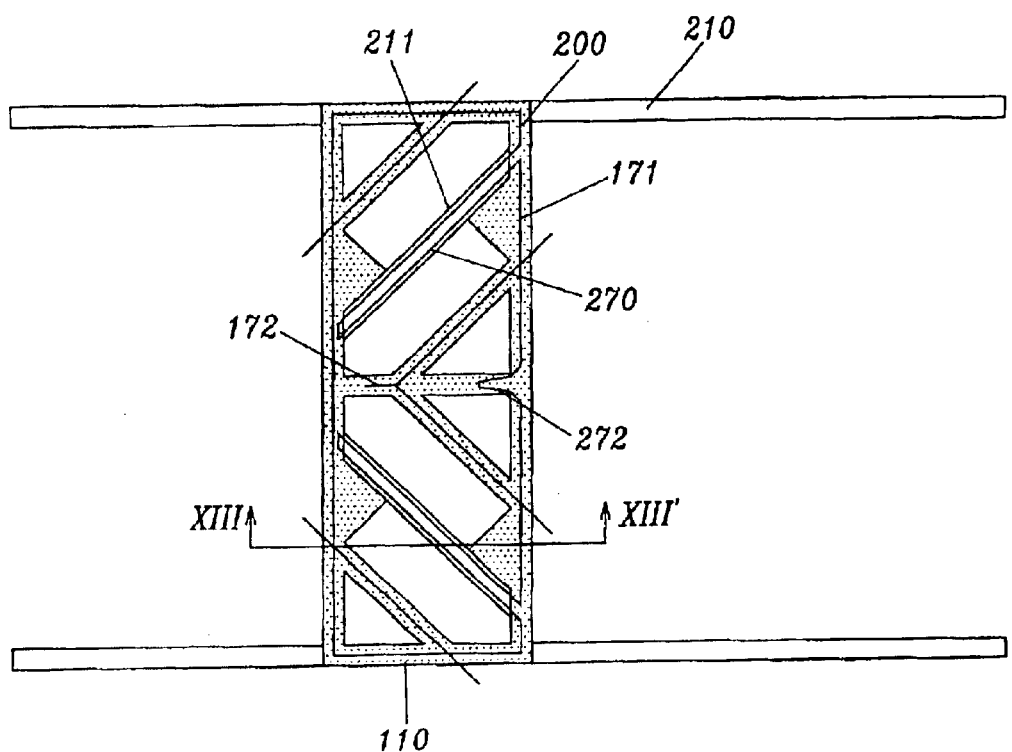
FIG. 12 is a layout view of a pixel in an LCD having the TFT substrate and the color fitter substrate shown in FIGS 10 and 11.
Figure 13:
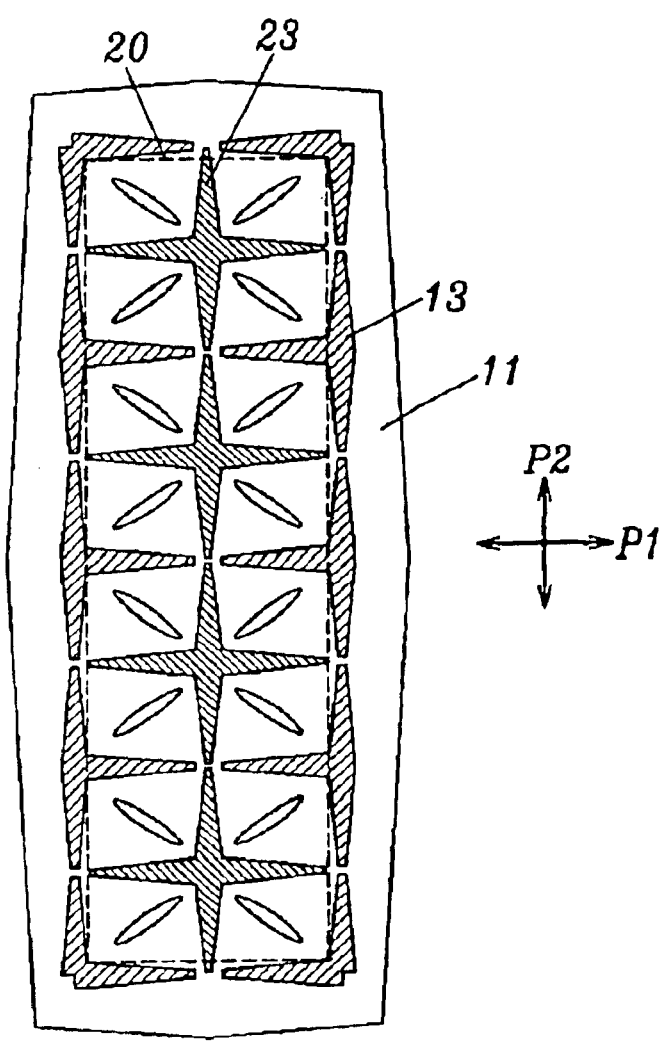
FIG. 13 is a sectional view of the LCD shown in FIG. 12 taken along the line XIV–XIV'.

FIG. 12 is a layout view of a pixel in an LCD having the TFT substrate and the color filter substrate shown in FIGS. 10 and 11. FIG. 13 is a sectional view of an LCD shown in FIG. 12 taken along the line XIII–XIII'.

As shown in FIGS. 12 and 13, a portion 211 of a gate line 210 is formed on a lower TFT substrate. The gate line 210 has a trapezoid shape without the lower side. An insulating layer 220 covers the gate line. A pixel electrode 200 is formed on the insulating layer 220, and portions of the pixel electrode 200 are removed to form wedge-shaped aperture pattern 270 over the portion 211 of the gate line 210. A vertical alignment layer 240 is formed on the pixel electrode 200.

On the other hand, a black matrix 110 is formed on a upper color filter substrate 20 to cover the outside of the pixel electrode 200, the protrusions 170 and the disclination regions. In the pixel region within the black matrix 110, a color filter substrate 120 is formed and an ITO common electrode 130 is formed over the color filter substrate 20. A protrusions 170 made of organic or inorganic material is formed on the common electrode 130 over the black matrix 110. The protrusions 170 formed on the upper substrate overlaps the black matrix 110 and is arranged alternately to the apertures 270 formed on the lower substrate, and the protrusions 170 and the apertures 270 are parallel to each other.

Polarizers 13 and 23 may be attached to the outer surfaces of two substrates 10 and 20, and their polarize axes are perpendicular to each other.

Compensation films 133 and 233 may be attached between one of the substrates 10 and 20 and one of the polarizers 13 and 23 attached thereto.

A liquid crystal material layer 30 with negative dielectric anisotropy is interposed between two substrate 10 and 20, and the liquid crystal molecules are homotropically aligned to the substrates 10 and 20 by the aligning force of the alignment layers 140 and 240. Near the protrusions 170, the liquid crystal molecules are aligned to be perpendicular to the surface of the protrusions 170.

Figure 14:
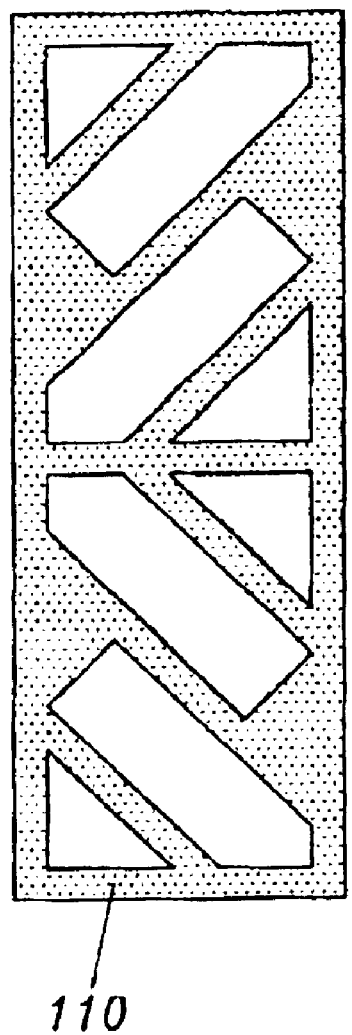
FIG. 14 is a layout view of a pixel region in a color filter substrate having a black matrix according to the sixth embodiment of the present invention.

It is possible to form a gate line as in a conventional LCD, and then the aperture pattern formed on the lower substrate is also covered by the black matrix, as shown in FIG. 14 which is a layout view of a pixel region in a color filter substrate according to the sixth embodiment of the present invention.

A black matrix 110 is formed to define a pixel region and to cover the protrusions 170 for forming multi-domains, the disclination between wedge-shaped protrusion pattern 170 and aperture pattern 270 and the disclination generated in the bent portion of the protrusion pattern 170 and the aperture pattern 270 as in the fifth embodiment. In addition, the black matrix 110 includes another portion to cover the apertures 270 formed on the lower substrate.

If the black matrix covers the patterns 170 and 270 and the disclination as in the sixth embodiment, it is not necessary to consider the influence due to the change of the gate line and no additional process step is required.

Moreover, the shape of the pixel electrode may be changed instead of forming the branches in the fourth embodiment.

Figure 15:
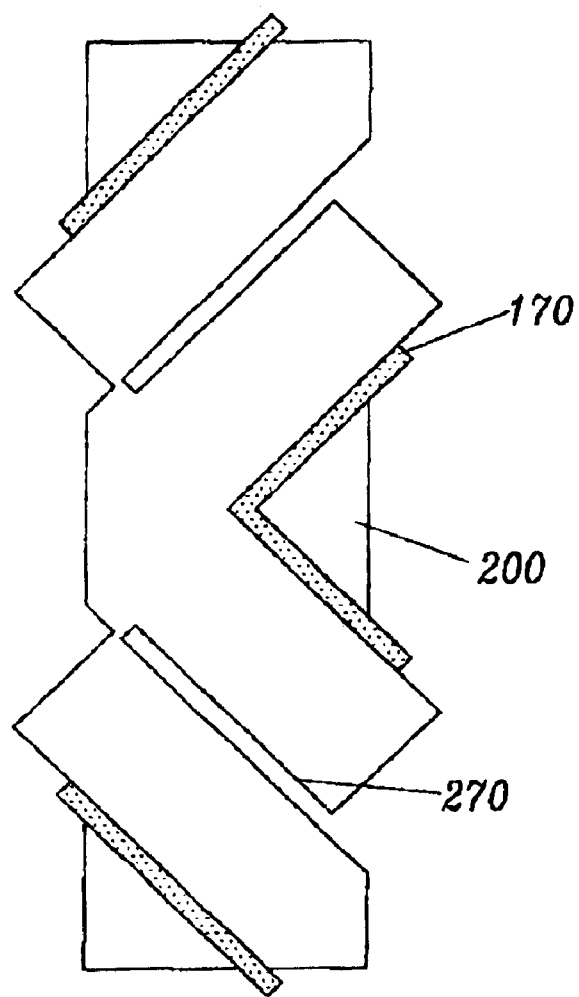
FIG. 15 is a layout view of a pixel in an LCD having a modified pixel electrode according to the seventh embodiment of the present invention.

In the seventh embodiment of the present invention shown in FIG. 15, a pixel electrode is changed to prevent from decrease of the luminance.

As described above, the region where the disclination is generated is the region where the aperture pattern 270 on the TFT substrate meets the edges of the pixel electrode 200.

Therefore, in the eighth embodiment of the present invention, the edge of the pixel else 200 between the apertures 70 and the protrusions 170 is perpendicular to the protrusion pattern 170. The widths of the apertures 270 and the protrusions 170 are preferably 30 to 20 microns respectively, and the distance between the patterns 170 and 270 is preferably in the range of 5 to 50 microns.

Figure 16:
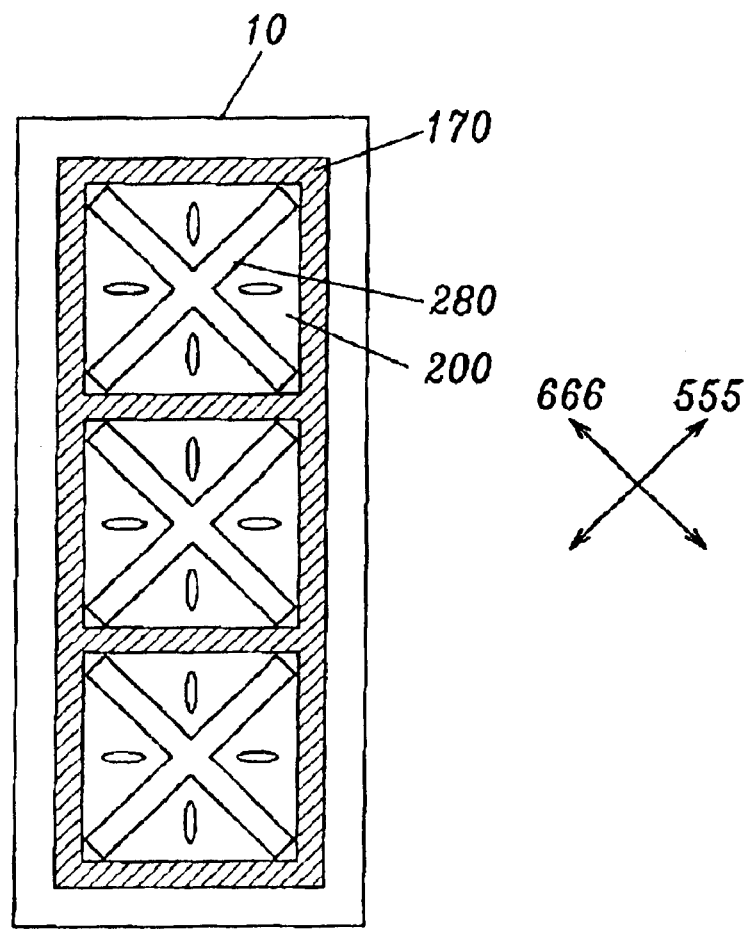
FIG. 16 is a layout view of a pixel in an LCD having patterns for forming multi-domains according to the eighth embodiment of the present invention

The eighth embodiment having patterns for four-domains is shown in FIG. 16.

As shown in FIG. 16, an aperture pattern including a plurality of apertures 280 is formed in a pixel electrode 200 on a TFT substrate 10 and has a X shape having the first and the second portions crossing each other at a right angle. A protrusion 170 is formed of one portion corresponding to the edges of the pixel electrode 100 and the other portion transversing the spaces between the apertures 280.

The liquid crystal layer in the single pixel have four domains having different tilt directions by the apertures 280 and the protrusion 170, and the long axes of the liquid crystal molecules in the adjacent domains arranged at an angle of 90 or 180 degrees.

It is suitable that the polarizer are attached to the substrate 10 and 20 in a manner that polarizing directions 555 and 666 are perpendicular to each other. The polarizing directions 555 and 666 make an angle of 45 degrees with the long axes of the liquid crystal molecules.

Figure 17:
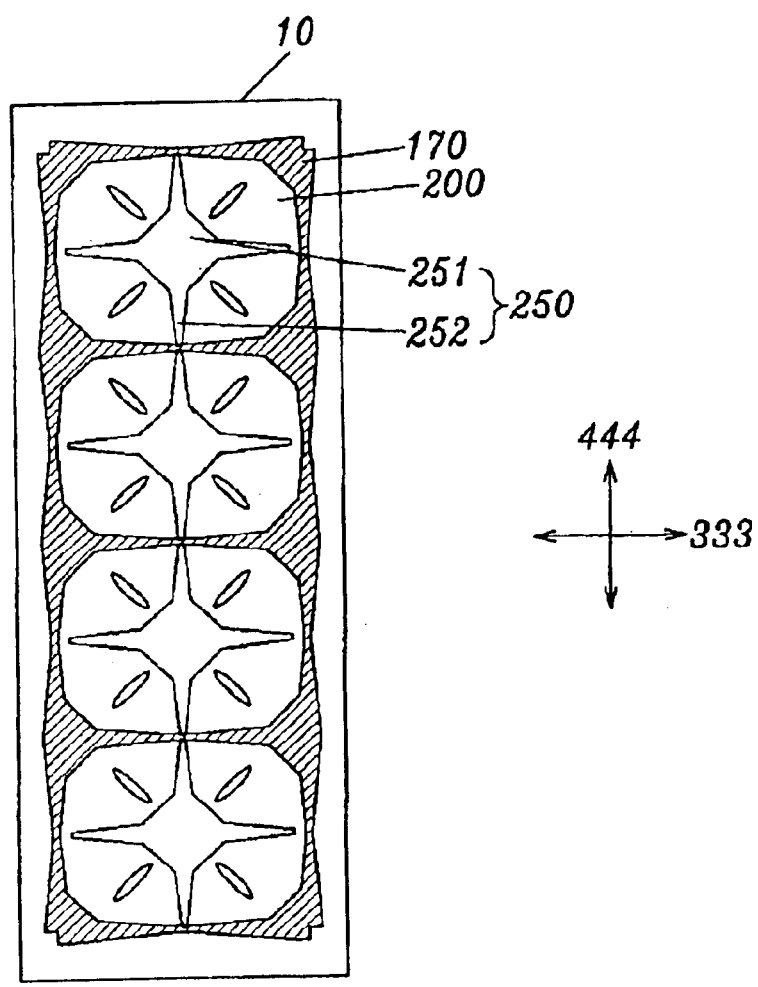
FIGS. 17 and 18 are layout views of pixels in a LCD having patterns for forming multi-domains according to the ninth and the tenth embodiments of the present invention, respectively.
Figure 18:
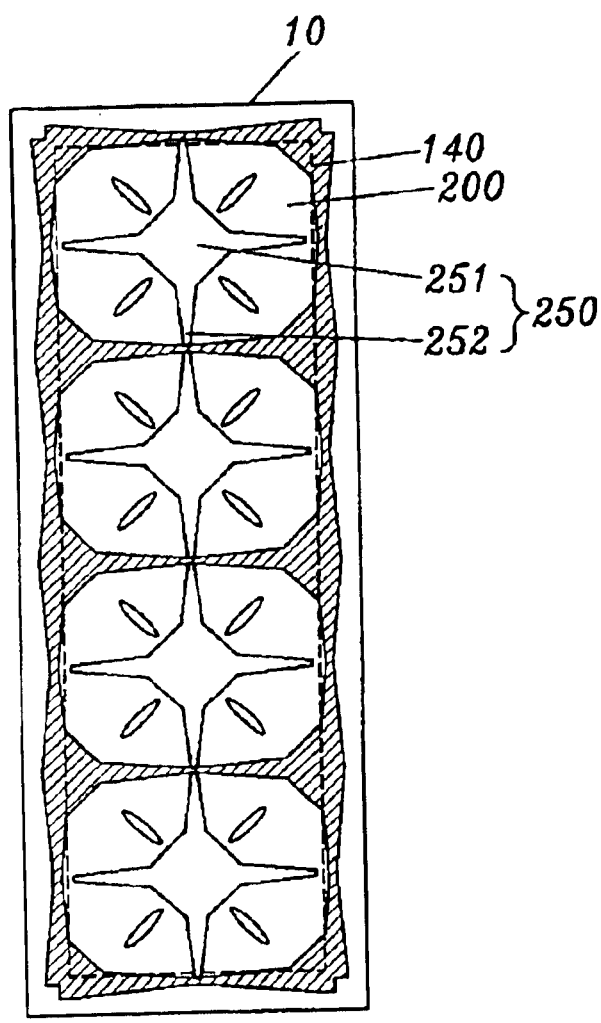

FIGS. 17 and 18 are layout views of pixels in a LCD having patterns for multi-domains according to the ninth and the tenth embodiments of the present embodiment. A protrusion pattern overlaps substantially the boundary of a pixel electrode or is located substantially inside the pixel erode in FIG. 17, while it is substantially located outside the pixel electrode in FIG. 18.

As shown in FIGS. 17 and 18, a substantially cross-shaped aperture pattern including a plurality of apertures 250 is formed in a pixel electrode 200 on a TFT substrate 10, and a protrusion pattern 170 surrounding the cross-shaped apertures 250 is formed on a color filter substrate.

The four domains are obtained by the apertures 250 and the protrusion 170, and the long axes of the liquid crystal molecules interposing been the substrates are perpendicular to each other.

It is possible to modify the shape of the cross shapes as in FIGS. 17 and 18.

The modified cross-shaped apertures 250 includes a diamond-shaped portion 251 and extended portions 252. The extended portions 252 extend outwards from the corners of the diamond 251 and make a right angle with each other. The width of the extended portions 252 decreases gradually as goes from the point connected to the portion 251 to the ends of the extended portions 252. Oblique sides of the diamond portion 251 are parallel to the corresponding oblique sides of protrusion 170 respectively because the protrusion pattern 170 and aperture pattern 250 have substantially the same shapes each other even though the centers of the patterns 170 and 250 are alternately arranged.

Therefore, the liquid crystal molecules between the patterns 250 and 170 are arranged relatively unit and the response time is reduced.

In this case, it is suitable that polarizing directions of the polarizer on two substrates are respectively a vertical direction 444 and a horizontal direction 333 such that the long axes of the liquid crystal molecules make an angle of 45 degrees with the polarizing directions.

The widths of the patterns 170 and 260 are preferably in the range of 3 to 20 microns respectively and the height of the protrusion pattern 170 is 0.3 to 3.0 microns. If the width is too narrow, the region where the liquid crystal molecules incline by the fringe field is too small, and therefore the effect of multi-domains is not sufficiently gained. On the contrary, if the width is too large, the aperture ratio becomes low.

The distance between the protrusion pattern 170 and the aperture pattern 250 is in the range of 10 to 50 microns. However, it depends on the size or the shape of the pixel.

For high-aperture ratio, the embodiment shown in FIG. 18 in which the protrusion pattern 170 outside the edges of the pixel electrode 200 is superior to the embodiment shown in FIG. 17 in which the protrusion pattern 170 overlaps the edges or is located inside the edges.

Next, a manufacturing method of a liquid crystal display for forming multi-domains is described.

FIG. 19A to FIG. 19E are cross sectional views of the intermediate structures of a color filter substrate when manufactured according to the embodiments shown in FIG. 5.

Figure 19A:
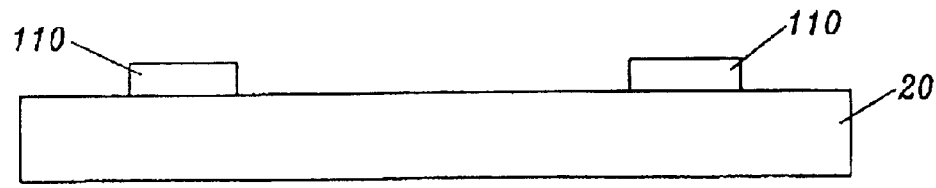
FIG. 19A to FIG. 19E are cross sectional views of the intermediate structures of a color filter substrate when manufactured according to the embodiments shown in FIG. 5.
Figure 19B:
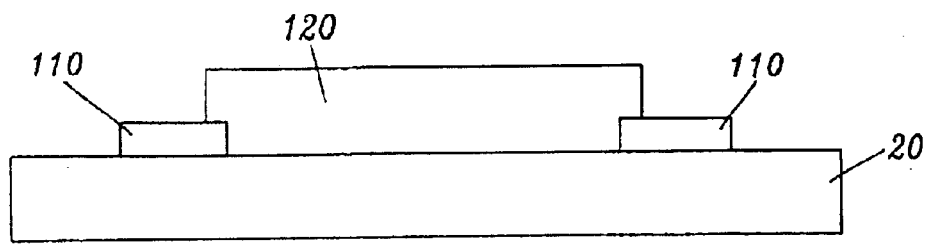

As shown in FIGS. 19A and 19B, a black matrix 110 is formed on a transparent insulating substrate 20 and a color filter 120 is formed within the black matrix 110.

Figure 19C:
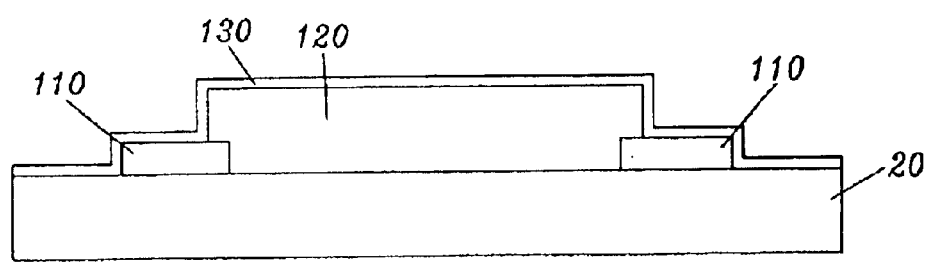

Then, as shown in FIG. 19C, an ITO layer is deposited thereon to form a common electrode 130.

Figure 19D:
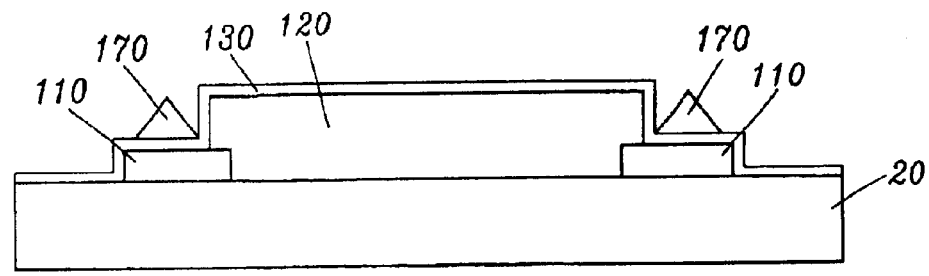
Figure 19E:
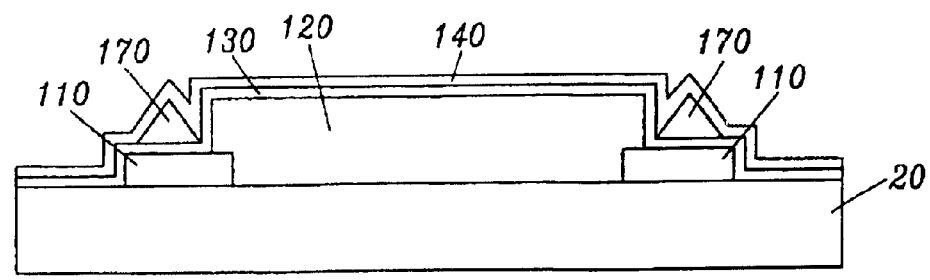

As shown in FIGS. 19D and 19E, a photo-sensitive film such as photoresist or polyimide film is coated on the common electrode 130 with the thickness of 3 to 20 microns, exposed, developed and baked to form a protrusion pattern 170 with 0.3 to 3 micron width. The protrusion pattern 170 may overlap the black matrix 110. Then, a vertical alignment layer 140 is coated thereon.

FIG. 20A to FIG. 20D are cross sectional views of the intermediate structures of a TFT substrate when manufactured according to the embodiments in FIG. 5.

As shown in FIGS. 20A to 20D, a gate wire including gate lines 210 is formed on a transparent insulating substrate 10, and a gate insulating film 220 is deposited theron. Afterward, an active layer (not shown) and a data wire (not shown) are formed to form a TFT.

Figure 20A:
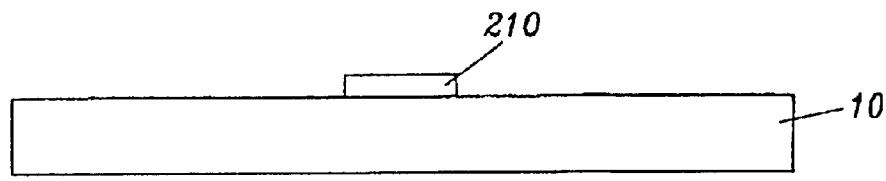
FIG. 20A to FIG. 20D are cross sectional views of the intermediate structures of a TFT substrate when manufactured according to the embodiments shown in FIG. 5.
Figure 20B:
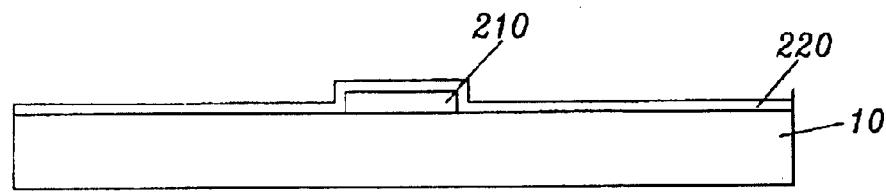
Figure 20C:
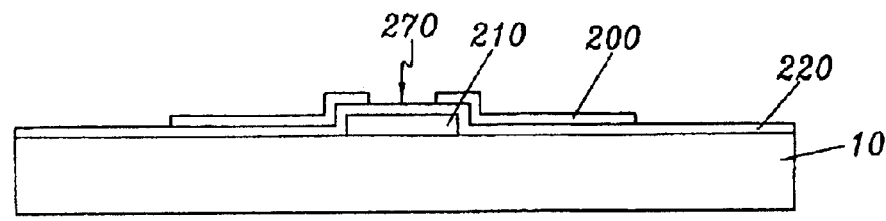
Figure 20D:
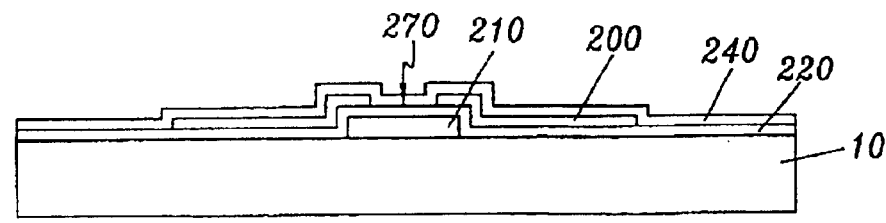

As shown in FIG. 20C, a passivation film 220 is formed, and a transparent conductive material such as ITO is deposited and patterned to form a pixel electrode 200. In this step, an aperture pattern 270 with 3 to 20 micron width is formed in the pixel electrode 200.

Then, a vertical arrangement layer 240 is coated thereon.

As a result, the aperture pattern may be formed in the steps of forming the pixel electrode 200 without any additional step.

The TFT and the color filter substrate 10 and 20 formed according to the methods shown in FIGS. 19A to 19E and in FIGS. 20A to 20D are assembled with each other in a manner that the protrusions 170 and the aperture patterns 270 are alternately arranged with a space. After liquid crystal having negative dielectric anisotropy is injected between two substrates, polarizers are attached on the surfaces of the substrates in a manner that the polarizing directions have a right angle each other.

The polarizing directions are at an angle of 45 degrees or at a right angle with respect to the protrusions 170 and apertures 270.

As described above, the apertures are formed at the step of forming the ITO pixel electrode and a passivation film may not be coated on color filters before forming step of the protrusions so that additional steps to realize VA-LCD having four-domains may not be performed.

Therefore, wide-viewing angle is obtained.

Furthermore, the black matrix or the gate line corresponds to the portions where the protrusions and the apertures are formed or the structure of the pixel electrode are changed so that tightness and contrast ratio are improved.

In the drawings and speculation, there have been disclosed typical preferred embodiments the invention and, although specific terms are employed, they are used in a generic and descriptive sense only and not for purposes of limitation, the scope of the invention being set forth in the following claims.

What is claimed is:

1. A liquid crystal display, comprising:
   a first substrate;
   a common electrode formed on the first substrate;
   a plurality of protrusions formed on the common electrode;
   a second substrate facing the first substrate;
   a pixel electrode having a plurality of apertures and formed on the second substrate; and
   first and second polarizers attached to outer surfaces of the first and second substrates, respectively, polarizing directions of the first and second polarizers being perpendicular to each other,
   wherein the protrusions have symmetrical cross sections and have a shape of a wedge-shaped line having a width,
   the apertures and the protrusions are arranged alternately, and
   the protrusion has a first branch extending along an edge of the pixel electrode from a position at which the aperture meets the edge of the pixel electrode with an acute angle.

2. The liquid crystal display of claim 1, wherein the width of the first branch decreases as advancing from the protrusion to an end of the first branch.

3. The liquid crystal display of claim 2, wherein the protrusion has a second branch extending from a convex point of the protrusion toward the aperture, and the aperture has an extension extending from a convex point of the aperture toward the protrusion.

4. The liquid crystal display of claim 3, wherein the width of the extension decreases as advancing toward an end of the extension, and the width of the second branch decreases as advancing toward the edge of the pixel electrode.

5. A liquid crystal display, comprising:
a first substrate;
a common electrode formed on the first substrate;
a plurality of protrusions formed on the common electrode;
a second substrate facing the first substrate;
a pixel electrode having a plurality of apertures and formed on the second substrate; and
first and second polarizers attached to other surfaces of the first and second substrates respectively, polarizing directions of the first and second polarizers being perpendicular to each other,
wherein the aperture has a shape of cross including first and second portions crossing each other at a right angle, and
the shape of the protrusion is tetragonal surrounding the aperture.

6. The liquid crystal display of claim 5, wherein the width of the aperture decreases as advancing from a center of the aperture to ends of the aperture.

7. The liquid crystal display of claim 6, wherein the center of the cross is diamond-shaped.

8. The liquid crystal display of claim 7, wherein the distance between the apertures is 10 to 50 microns.

9. The liquid crystal display of claim 5, wherein the protrusion is located substantially outside edges of the pixel electrode.

10. The liquid crystal display of claim 5, wherein a portion of the protrusion overlaps edges of the pixel electrode.

11. A liquid crystal display, comprising:
a first substrate;
a common electrode formed on the first substrate;
a plurality of protrusions formed on the common electrode;
a second substrate facing the first substrate;
a pixel electrode having a plurality of apertures and formed on the second substrate; and
first and second polarizers attached to outer surfaces of the first and second substrates, respectively, polarizing directions of the first and second polarizers being perpendicular to each other,
wherein the aperture has an X shape including first and second portions crossing each other at a right angle, and
the protrusion surrounds the X shaped aperture.

12. The liquid crystal display of claim 11, wherein the first and second portions are parallel to the polarizing axes of the first and second polarizers, respectively.

13. A liquid crystal display, comprising:
a first substrate;
a common electrode formed on the first substrate;
a plurality of protrusions formed on the common electrode;
a second substrate facing the first substrate;
a pixel electrode having a plurality of apertures and formed on the second substrate; and
first and second polarizers attached to outer surfaces of the first and second substrates, respectively, polarizing directions of the first and second polarizers being perpendicular to each other,
wherein the aperture has an X shape including first and second portions crossing each other at a right angle, and
the protrusion is located substantially outside edges of the pixel electrode.

14. A liquid crystal display, comprising:
a first substrate;
a common electrode formed on the first substrate;
a plurality of protrusions formed on the common electrode;
a second substrate facing the first substrate;
a pixel electrode having a plurality of apertures and formed on the second substrate; and
first and second polarizers attached to outer surfaces of the first and second substrates respectively, polarizing directions of the first and second polarizers being perpendicular to each other,
wherein the aperture has an X shape including first and second portions crossing each other at a right angle, and
a portion of the protrusion overlaps edges of the pixel electrode.

15. A liquid crystal display comprising:
a first substrate including a pixel electrode having at least a wedge-shaped aperture;
a second substrate facing the first substrate and including a common electrode and at least a wedge-shaped protrusion on the common electrode, the protrusion being parallel and alternate to the aperture; and
a black matrix on the second substrate, the black matrix including a first portion overlapping the protrusion, a second portion passing through bent points of the protrusion the aperture and a third portion covering a region where the protrusion and the aperture meet a boundary of the pixel electrode.

16. The liquid crystal display of claim 15, wherein the black matrix further includes a fourth portion overlapping the protrusion.

17. The liquid crystal display of claim 15, wherein the third portion of the black matrix is triangular.

18. A liquid crystal display, comprising:
a first substrate having a plurality of pixel electrodes including a first electrode;
a second substrate facing the first substrate and including a second electrode; and
a plurality of protrusions provided on at least one of the first and second substrates, the plurality of protrusions including first and second protrusions having shapes of substantially straight lines,
wherein either the first and second protrusions or imaginary extensions of the first and second protrusions meet each other.

19. The liquid crystal display of claim 18, wherein the first and second protrusions are located substantially in an area corresponding to the first pixel electrode.

20. The liquid crystal display of claim 19, wherein the first and second protrusions are oblique to edges of the first pixel electrode.

21. The liquid crystal display of claim 20, wherein the first and second protrusions are substantially symmetrically arranged with respect to a first line substantially parallel to the edges of the first pixel electrode.

22. The liquid crystal display of claim 21, wherein each of the first and second protrusions has first and second ends opposite to each other, and
the first and second protrusions either are separated from each other or meet only near the first ends of the first and second protrusions.

23. The liquid crystal display of claim 22, wherein the first pixel electrode has first to fourth principal edges, the first and second principal edges are opposite and substantially parallel to each other, the third and fourth principal edges are opposite and substantially parallel to each other, and the first and second principal edges are shorter than the third and fourth principal edges.

24. The liquid crystal display of claim 23, wherein the first line is substantially parallel to the first and second principal edges.

25. The liquid crystal display of claim 24, wherein the first ends of first and the second protrusions are located near the third principal edge.

26. The liquid crystal display of claim 25, wherein the second ends of the first and second protrusions are located near the first and second principal edges, respectively.

27. The liquid crystal display of claim 24, wherein the second ends of the first and second protrusions are located near the fourth principal edge.

28. The liquid crystal display of claim 27, wherein the first ends of the first and second protrusions are located near the first line.

29. The liquid crystal display of claim 28, wherein the plurality of protrusions includes a third protrusion extending from the first ends of the first and second protrusions toward the third principal edge along the first line.

30. The liquid crystal display of claim 29, wherein a width of the third protrusion decreases as goes to the third principal edge.

31. The liquid crystal display of claim 22, wherein the first and second protrusions form a wedge shape.

32. The liquid crystal display of claim 22, wherein at least one of the first and second protrusions has a branch extending along an edge of the first pixel electrode.

33. The liquid crystal display of claim 18, wherein one of the first and second electrodes has a plurality of apertures including first and second apertures having shapes of substantially straight lines.

34. The liquid crystal display of claim 33, wherein the first and second apertures are substantially parallel to at least one of the first and second protrusions.

35. The liquid crystal display of claim 34, wherein the first and second apertures are substantially parallel to the first and second protrusions, respectively.

36. The liquid crystal display of claim 35, wherein the first and second apertures are alternate to the first and second protrusions, respectively.

* * * * *

UNITED STATES PATENT AND TRADEMARK OFFICE
CERTIFICATE OF CORRECTION

PATENT NO. : 6,710,837 B1
DATED : March 23, 2004
INVENTOR(S) : Jang-Kun Song et al.

It is certified that error appears in the above-identified patent and that said Letters Patent is hereby corrected as shown below:

Title page,
Item [56], References Cited, U.S. PATENT DOCUMENTS, insert
-- 6,407,794 A *    6/2002    Koma ...... 349/141 --
Item [57], ABSTRACT,
Line 16, change "surface" to -- surfaces --.

Column 13,
Line 23, change "other" to -- outer --.

Signed and Sealed this

Ninth Day of November, 2004

JON W. DUDAS
*Director of the United States Patent and Trademark Office*